United States Patent

Bryan

Patent Number: 5,867,404
Date of Patent: Feb. 2, 1999

[54] METHOD AND APPARATUS FOR MONITORING RAILWAY DEFECTS

[75] Inventor: Michael A. Bryan, Los Gatos, Calif.

[73] Assignee: Cairo Systems, Inc., Los Gatos, Calif.

[21] Appl. No.: 828,469

[22] Filed: Mar. 31, 1997

Related U.S. Application Data

[60] Provisional application No. 60/014,701 Apr. 1, 1996.

[51] Int. Cl.[6] .............................. H04B 7/185; G01S 5/02
[52] U.S. Cl. ........................ 364/550; 364/449.1; 73/587; 342/457
[58] Field of Search ..................... 364/550, 449.1–449.9; 73/593, 587; 342/357, 457; 246/122 R, 169 R

[56] References Cited

U.S. PATENT DOCUMENTS

| | | |
|---|---|---|
| 4,790,190 | 12/1988 | Bambara et al. .......................... 73/660 |
| 4,843,885 | 7/1989 | Bambara ................................... 73/660 |
| 5,150,618 | 9/1992 | Bambara ................................... 73/660 |
| 5,433,111 | 7/1995 | Hershey et al. .......................... 73/593 |
| 5,578,877 | 11/1996 | Tiemann ................................... 310/15 |
| 5,579,013 | 11/1996 | Hershey et al. ......................... 342/357 |
| 5,721,685 | 2/1998 | Holland et al. ....................... 364/449.1 |

*Primary Examiner*—James P. Trammell
*Assistant Examiner*—Shah Kaminis
*Attorney, Agent, or Firm*—Townsend and Townsend and Crew LLP

[57] ABSTRACT

A method for monitoring defects in a railway with a computer system, the computer system includes the steps of determining positional data and status data for a railway, comparing historical status data to the status data to determine a defect for the railway, the defect having a defect type, displaying an image of a particular geographic area on a display that includes a location corresponding to the positional data, determining an icon associated with the defect type, and displaying the icon associated with the defect type on the display.

20 Claims, 11 Drawing Sheets

METHOD AND APPARATUS FOR MONITORING RAILWAY DEFECTS

CROSS-REFERENCE TO RELATED APPLICATIONS

This present application claims priority from provisional patent application U.S. Ser. No. 60/014,701, in the name of Michael A. Bryan, filed Apr. 1, 1996, which is hereby incorporated by reference for all purposes. This application is being filed concurrently with U.S. Ser. Nos. 08/829,429, currently pending, (Attorney Docket No. 17695-000110, 08/829,771, currently pending, (Attorney Docket No. 17695-000120), currently pending and 08/829,008 (Attorney Docket No. 17695-000130), currently pending, which are hereby incorporated by reference for all purposes.

METHOD AND APPARATUS FOR MONITORING RAILWAY DEFECTS

This present invention relates to a technique for monitoring activity on mobile vehicles. More particularly, the invention is illustrated in an example related to monitoring rail track defects using a locatable rail car coupled to motion sensors and analyzing the track defects using a processing device.

The fixed rail transportation industry has been around in the United States since the industrial revolution. This type of transportation is used extensively today in moving both cargo and people from one geographical location to another geographical location. In the United States, numerous rail companies move millions of pounds of cargo, and thousands or even millions of people, throughout the continental United States yearly. In more densely populated countries such as Japan, "bullet trains" are used extensively to transport people from a busy metropolitan area such as Tokyo to Osaka or the like. In France, high speed rail systems such as the TGV continue to become more important as the population of the country increases. As such, there are literally thousands or even millions of miles of railroad tracks traversing the United States, among numerous other countries.

These railroad tracks, however, must be routinely inspected to prevent a possibility of track failure. Track failure often occurs by way of soil and gravel displacement, or erosion of timber that is used underlying the railroad tracks, for example. Unfortunately, track failure occurs at an alarming rate, which often leads to significant property damage and even death, in some cases.

In the United States, for instance, there are literally thousands of train related accidents due to track failures yearly. Literally tens of thousands of people are affected by way of environmental contamination caused by derailing train cars from track failure. Property damage caused by track failure is often in the millions of even billions of dollars yearly.

An article in the Los Angeles Times headlined "Tragedy on the Rails." This article stated that an eight car train carrying dangerous chemicals plunged from the rails and exploded in flames before dawn hurling a noxious cloud into the sky which forced the closing an interstate highway. Two bodies were found near the derailed train. A monstrous fire, throwing flames 600 to 800 feet in the air, burned bad and high causing significant damage to person and property. This article is merely one example of the type of damage caused by track failure.

Accordingly, industry has proposed some techniques in an attempt to prevent track failure. One of these techniques is to merely perform a visual inspection of the track during maintenance rounds. This visual inspection often involves railroad workers that walk down the track and visually look for possible track failures. This technique often requires large human capital and is not generally efficient for predicting the behavior of railroad tracks in a routine manner.

Other techniques have been proposed to detect certain defects in a rail way system using sensors. These techniques are, however, limited. In particular, they can only provide information for chronic or severe defects, which must be repaired immediately. These sensors are essentially "dumb" and cannot really be used to predict the future behavior of the railway system. Additionally, the techniques are generally in terms of providing sensing techniques for the rail car unit itself, similar to sensors used to track engine oil pressure, temperature, and the like. Accordingly, there are simply no effective techniques for identifying potential defects in the railroad assembly.

From the above, it can be seen that a technique for identifying potential defects on a railway system is often desirable.

SUMMARY OF THE INVENTION

According to the present invention, a technique including a system and method for detecting anomalies in a railway car system to predict track failures is provided. The present technique uses a plurality of sensing device including a tilt sensor and an accelerometer coupled to a global positioning sensor for detecting a presence of anomalies in a moving rail car vehicle for predicting a behavior of a railway system.

In a specific embodiment, the invention provides a method for monitoring defects in a railway with a computer system, includes the steps of determining positional data and status data for a railway, comparing historical status data to the status data to determine a defect for the railway, the defect having a defect type, displaying an image of a particular geographic area on a display that includes a location corresponding to the positional data, determining an icon associated with the defect type; and displaying the icon associated with the defect type on the display.

In an alternative specific embodiment, the invention provides a computer system for monitoring railway defects, the computer system including a processor, a display coupled to the processor. The computer system also includes a computer-readable media coupled to the processor including code that directs the processor to determine positional data and status data for a railway, code that directs the processor to compare historical status data to the status data to determine a defect for the railway, if any, the defect having a defect type, code that directs a display to display an image of a particular geographic area that includes a region associated with the positional data, code that directs the processor to determine an icon associated with the defect type, if any, and code that directs the display to display the icon associated with the defect type.

In a further alternative embodiment, the invention provides a computer program product for a computer including a processor for monitoring railway defects, the computer program product including a computer-readable media including code that directs the processor to determine positional data and status data for a railway, code that directs the processor to compare historical status data to the status data to determine a defect for the railway, the defect having a defect type, code that directs a display to display an image of a particular geographic area that includes a locating associated with the positional data, code that directs the processor to determine an icon associated with the defect type, and code that directs the display to display the icon associated with the defect type.

Numerous benefits are achieved over pre-existing techniques using the present invention. In particular, the present invention provides a unique hardware and software modules for monitoring railways defects. Additionally, the present invention provides hardware and software modules for generating work orders for repairing railway defects.

Furthermore, the present invention substantially reduces or even eliminates any subjectivity of analyzing a defect, which is often present using conventional human inspection techniques. Moreover, the present invention provides data to railway workers who can repair or replace possibly damaged sections of railroads to prevent the occurrence of accidents that can cause damage to railroad equipment, environment, and human beings, in some cases. Accordingly, the present invention uses the unique sensing device and tracking system for overcoming defects in present railway systems, thereby saving costs related to damage, possible damage to the environment from accidents, and human lives. These benefits and others are further described throughout this specification.

The present invention achieves these benefits in the context of known process technology. However, a further understanding of the nature and advantages of the present invention may be realized by reference to the latter portions of the specification and attached drawings.

DESCRIPTION OF SPECIFIC EMBODIMENTS

I. System Overview

Figure 1:
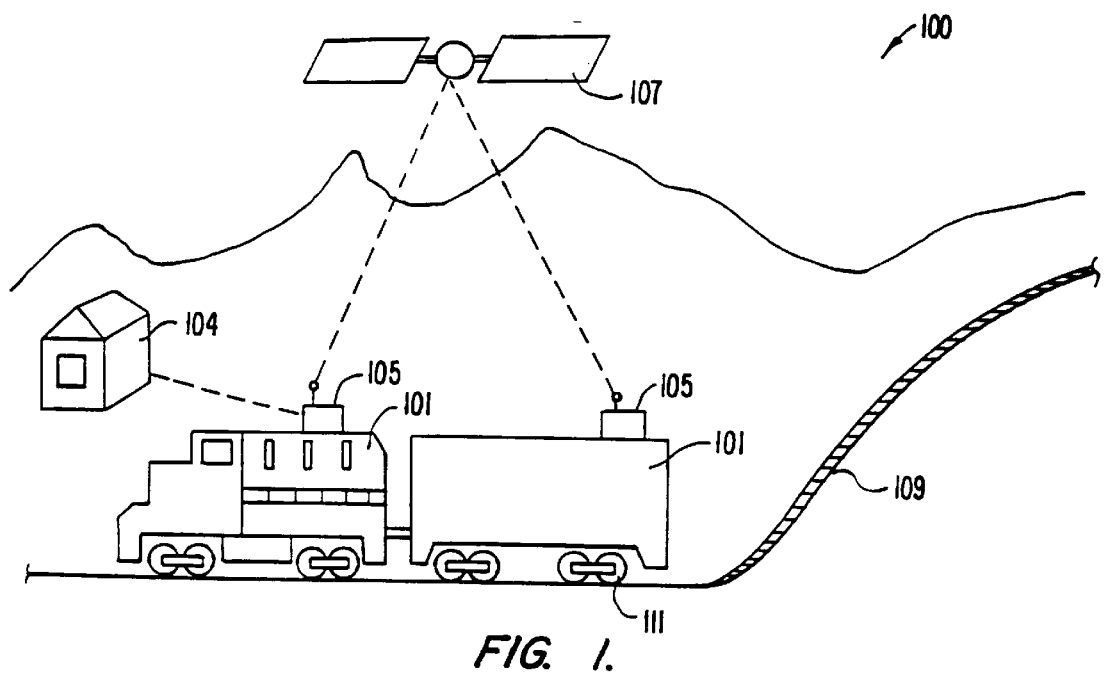
FIG. 1 is a simplified diagram of a rail car monitoring system according to the present invention.

FIG. 1 is a simplified diagram of a rail car system 100 according to the present invention. This diagram is merely an illustration and should not limit the scope of the claims herein. One of ordinary skill in the art would recognize other variations, modifications, and alternatives.

The rail car system 100 includes a variety of elements such as a rail car(s) 101, a tracking station 104, a tracking device(s) 105, a satellite 107, among other elements. As shown, the rail car 101 connects to one or more cars in a conventional manner and traverses along a track 109. In common terms, the connection of various rail cars as a unit is referred to as a train. The train often include a locomotive or engine car, which pulls or provides power to other car units. Storage cars connect to the engine car for carrying goods, chemical, people, and the like from one track location to another track location. A caboose connected to the end oversees the train operation.

Each rail car 101 includes typical elements such as ground wheels 111, which can run along track 109. The rail car 101 travels along railroad tracks found in almost any country and state. The rail car 101 also includes a tracking device 105, which monitors a variety of information derived from the rail car and the track. The tracking station 104 stores and analyzes the information derived from the tracking device on the rail car over time.

Figure 1A:
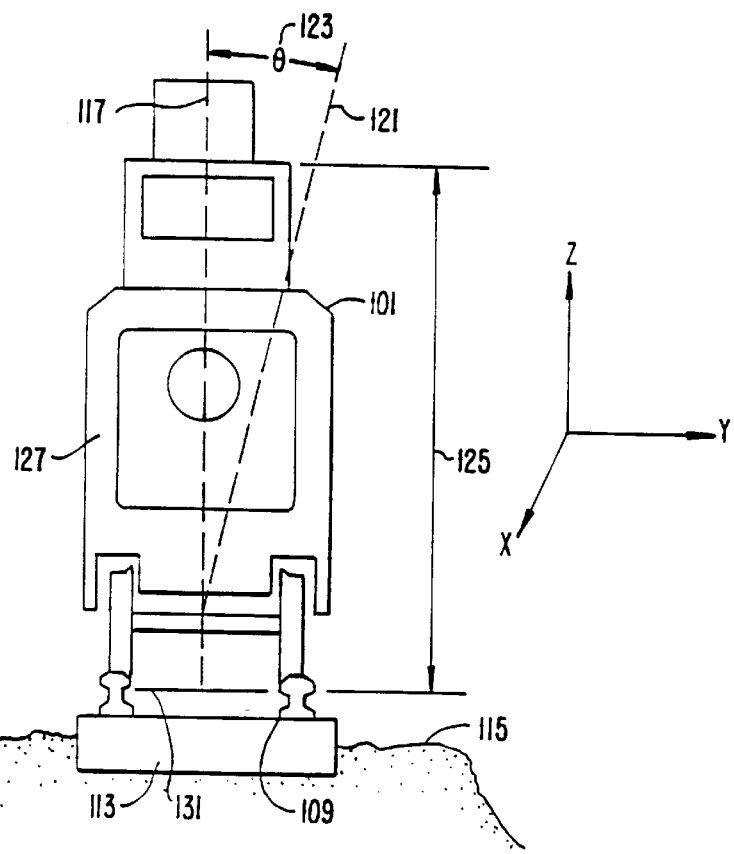
FIG. 1A is a simplified front-view diagram of the rail car of FIG. 1 according to the present invention.

FIG. 1A is a simplified front-view diagram of the rail car of FIG. 1 according to the present invention. This diagram is merely an illustration and should not limit the scope of the claims herein. This diagram is shown to illustrate the changes in acceleration and angle that the rail car undergoes when the rail car travels over an anomaly (e.g., broken track, displaced gravel, weak rail tie, cracked track) in the railroad track.

The rail car 101 traverses along track 109, which is placed on a railroad tie 113. Railroad tie 113 is provided on a bed of gravel 115 or the like. This gravel is often called packing. As the railroad tie or packing becomes defective, the rail car flexes the track portion with the anomaly, which deflects the rail car 101 in an angle θ123 between a line 121 relative to a z-axis 117. The tracking device 104 includes a motion sensor that can detect the angle 123 and relative acceleration of the rail car 101. As the railroad tie 113 or packing 115 becomes even more defective, the angle of deflection or rail car acceleration can become even greater, which may indicate even a higher probability of track failure or the like.

In a preferred embodiment of the present invention, rail car variables are kept at relatively constant values as the rail car travels over the track section with the anomaly so that the motion sensor detects any slight changes to the anomaly overtime. These variables include, among others, a speed of the rail car, weight of the rail car, sensor or tracking device placement (e.g., height and position relative to the underlying track). In a preferred embodiment, the tracking device 105 is mounted onto the rail car which has a relatively constant mass 127 relative to other trains and over time. An example of a constant mass car is the locomotive. In most cases, the weight of the locomotive is relatively constant except for the weight of the fuel. The constant mass car provides a similar ride for the motion sensor or the tracking device. Accordingly, the rail car should experience greater movement only as a result of more severe damage to the underlying railroad assembly having the anomaly. Alternatively, rail cars having different mass, speed, sensor placement, etc. can be used, preferably, so long as such quantities are recorded for later analysis and data normalization.

Preferably, the tracking device is placed near a top region of a locomotive, which allows for easier transmission of data from the tracking device to a wireless network, for example. In addition, the top of the locomotive has the greatest relative movement as compared to other car locations, which tends to provide better movement data. In other embodiments, the motion sensor is placed near the top region of the locomotive or other relatively constant mass cars. The tracking device or motion sensor should be placed at a certain height 125 and location 131 relative to the underlying railroad regardless of the type of rail car being used. This allows the tracking device to experience a similar height 125 and placement 131 environment regardless of the rail car.

Additionally, the rail car travels along a selected area of the railroad assembly, which has the anomaly, within a relatively constant speed range. This speed range should not vary greatly to provide accurate motion measurements based upon any change in the anomaly itself. The speed range should not vary greater than about a few miles per hour. A relatively constant speed range tends to ensure that the motion detector senses any change in the anomaly overtime, which is independent of the speed of the rail car.

II. Data Acquisition Module

Figure 2:
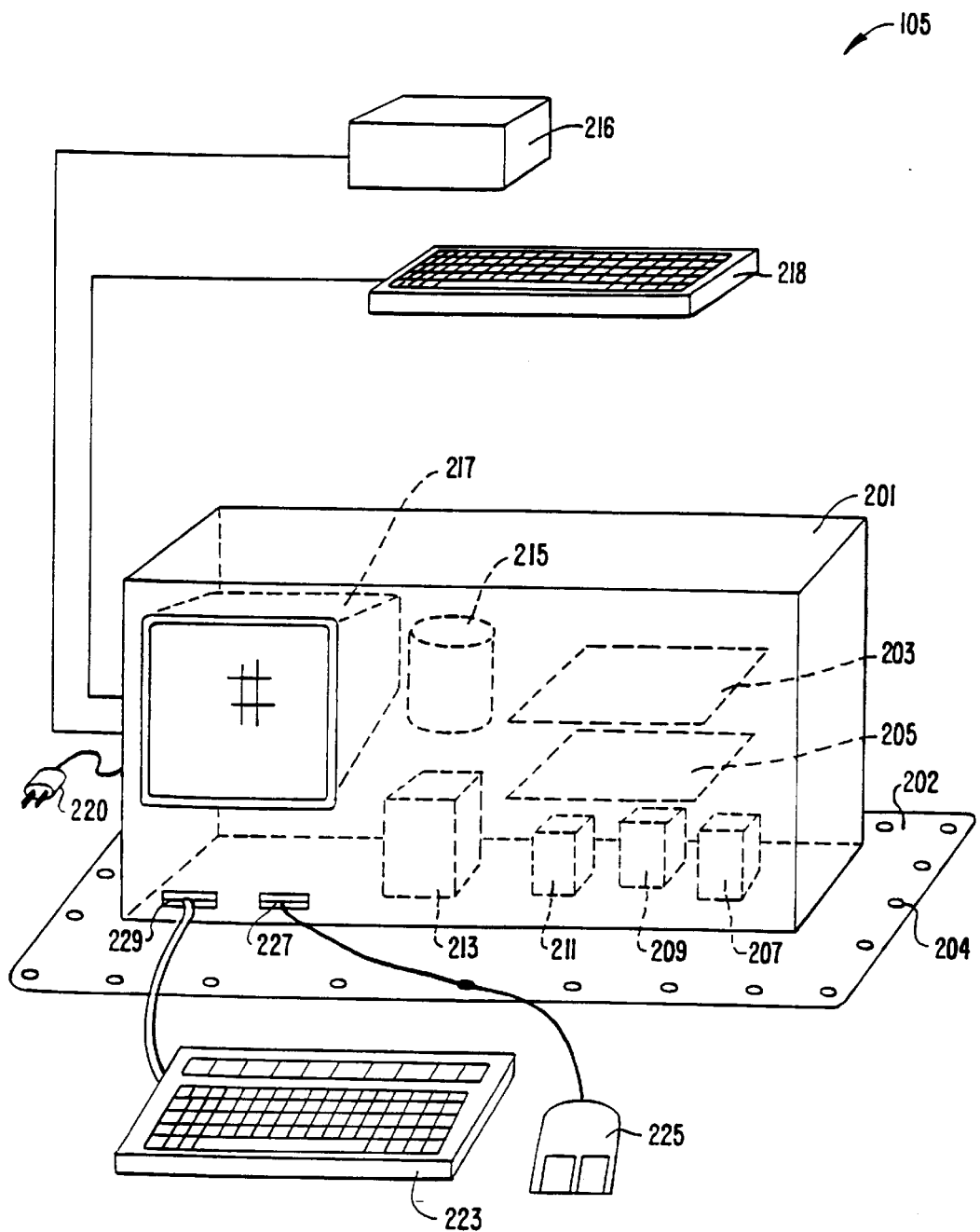
FIG. 2 is a simplified diagram of a device for the rail car of FIG. 1 according to the present invention.

FIG. 2 is a simplified diagram of a tracking device 105 according to the present invention. This is merely an example of a tracking device, which should not limit the scope of the claims herein. The tracking device 105 includes a housing 201. The housing 201 is made from a material that is suitable for use in an environment outside the rail car. The housing 201 can be made of a plastic or steel with sufficient resistance to weather and foreign objects, which can impact the housing 201 while the rail car traverse down the railroad track. The housing 201 is provided upon a flange 202, which includes a plurality of bolt holes 204 for fastening to an upper portion of the rail car. The flange 202 and bolt-on aspects of the housing allows for easy placement and removal of the tracking device 105 from the rail car for repair or analysis purposes.

The housing includes a variety of electronic elements (also known as data acquisition units), which are used for tracking information derived from the moving rail car unit. These electronic elements include an accelerometer 207 operably coupled to an interface board 205, which is coupled to a central processing board 203. The accelerometer 207 provides rail car movement information to the central processing board 203 from the moving rail car. The movement information includes sudden changes in rail car acceleration, shock motion experienced by the rail car, and rail car vibration, in some cases. The movement information derived from the accelerometer can be sent to a memory 215 or logging device in housing 201, or sent to an outside user through a radio modem 211, which transmits the movement information via a wireless communication network.

As merely an example, the accelerometer may utilize variable capacitance microsensors. The accelerometer is designed for measurement of a relatively low level acceleration in a rail car unit in a railway system. The accelerometer also can detect sudden shock motion, constant acceleration, and even vibrations from the rail car unit caused by the rail car or an anomaly in the track. A product available which has these features is a variable capacitance accelerometer sold under the name of Endevco Model 7290A. This accelerometer can operate from 9.5 V to 18.0 V and provide a high level, low impedance output. A +/−2 volt differential output is dc coupled at a dc bias of approximately 3.6 volt. Frequency response is controlled by near-critical damped sensors. The use of gas damping results in a small thermally-induced change from frequency response. Again, the Endevco Model 7290A is merely an example, and should not limit the scope of the claims herein.

The data acquisition units in tracking device 105 also includes a tilt sensor 209, which provides angular movement information to the central processing board 203 through the interface board 205. Similar to the information from the accelerometer, the angular movement information can be transferred to memory 215 for logging purposes, or sent to an outside user through the radio modem 211. A tilt sensor is generally a proportional non-linear sensor. The tilt sensor should be able to detect slight changes in angle, which ranges from about 0 to about 2 degrees from a position normal to gravity. In certain embodiments, the tilt sensor should be operable in a range from about 0 to about 5 degrees.

The tilt sensor also should be able to operate in a variety of ambient conditions. In particular, the tilt sensor should operate in a temperature range from about −55° to about 100° C. which is much greater than temperatures encountered by a typical rail car unit. In most cases, however, the tilt sensor operates in a temperature range from about −55° to about 55° C. A characteristic time associated with the tilt sensor should be able to allow the meter to recover from changes in the tilt sensor angle. The characteristic time is preferably less than about 1 second and more preferably less than about 0.5 second. An output from the tilt sensor can be in voltage units or the like, depending upon the application. An example of a tilt sensor is a product sold by the Fredericks Company. This product is commonly referred to as a "single axis sensor." This sensor comes in Series 0711 and 0713 designs, which provide for proportional non-linear sensing.

A global positioning sensor (GPS) 213, another data acquisition unit, is provided in the tracking device 105 to track a global position of the tracking device or of the moving rail car. GPS 213 includes a GPS receiver 216, among other elements. GPS 213 provides location information (e.g., longitude and latitude) to the central processing board 203 through the interface board 205. The location information is generally stored in memory 215, or transmitted to an outside user using the radio modem 211.

As merely an example, the GPS can be a product sold under the tradename of Placer™ GPS 300 made by Trimble Navigation. The GPS is a low-cost and high performance receiver and antenna. It is sufficiently rugged and lightweight, and housed all in a single package. The GPS mounts on both flat and curved surfaces, which may be ideal for the rail car. The GPS includes a standard RS-232 interface that outputs vehicle location messages in ASCII characters. Six channels allow for continuous tracking of the moving rail car. Output data includes a latitude, a longitude, a speed, a time, and a travel direction (e.g., north, south, east, west). Data acquisition time is less than two seconds in most cases. Position data can be updated once per second. Data can be transferred at baud rates of 300, 600, 1200, 2400, 4800, 9600, and others. Positional accuracy is within 2–5 meters under steady state conditions and about 15 meters under non-steady state conditions.

The GPS 300 can operate under a variety of conditions. For instance, it operates in a −40° C. to 70° C. temperature range. A non-operating temperature range is −55° C. to 85° C. The GPS can experience a shock of about 30 grams for 6 milliseconds. Operation also occurs in altitudes ranging from about −400 to +5,000 meters relative to sea level.

Humidity can be 98%/66° C. The GPS is also generally weather-proof and dust proof, which are desirable features.

Other data acquisition units include a speedometer for monitoring the speed of the rail car, a thermometer for monitoring the ambient temperature, an altimeter for monitoring the altitude of the rail car, and the like. Other such environmental data acquisition units are contemplated in alternative embodiments of the present invention.

Power to the tracking device 105 is provided by way of various power sources. In particular, a photovoltaic array 218 may provide power to some of the electronic elements described above. The rail car also provides power to the tracking device 105 using a standard connection device 220. Optionally, the tracking device 205 includes a backup battery power supply for times when the main power sources are not available. Additionally, the battery power supply allows for the removal of the tracking device without any loss of information from memory 215.

A display 217 is coupled to the central processing board 203 through the interface board 205. The display can be a flat panel display or a cathode ray tube-type display. In preferred embodiments, the display is a flat panel display, which is generally more durable and resistant to the natural environment. The display is used to output information from the memory 215 and to program software for the present methods, which will be described in more detail below.

A keyboard 223 allows a user to access memory 215 of the tracking device 105 through the central processing board 203. Optionally, a mouse 225 is used to access information from memory 215 through the central processing board 203. The keyboard 223 and mouse 225 are easily connected to the tracking device 105 by way of ports 229 and 227, respectively. These ports are generally sealed to prevent foreign contaminants (e.g., water, dust, dirt) from entering housing 201 while the rail car is in operation.

Keyboard 223, mouse 225, and display 217 (peripherals) are removable from tracking device 105. In one embodiment of the present invention, while tracking device 105 is collecting data in the field, keyboard 223, mouse 225, and display 217 are absent. These peripherals, however, are attached to tracking device 105 typically when the user downloads data from memory 215, uploads programs to memory 215, performs diagnostic tests upon tracking device 105, and the like.

Figure 3:
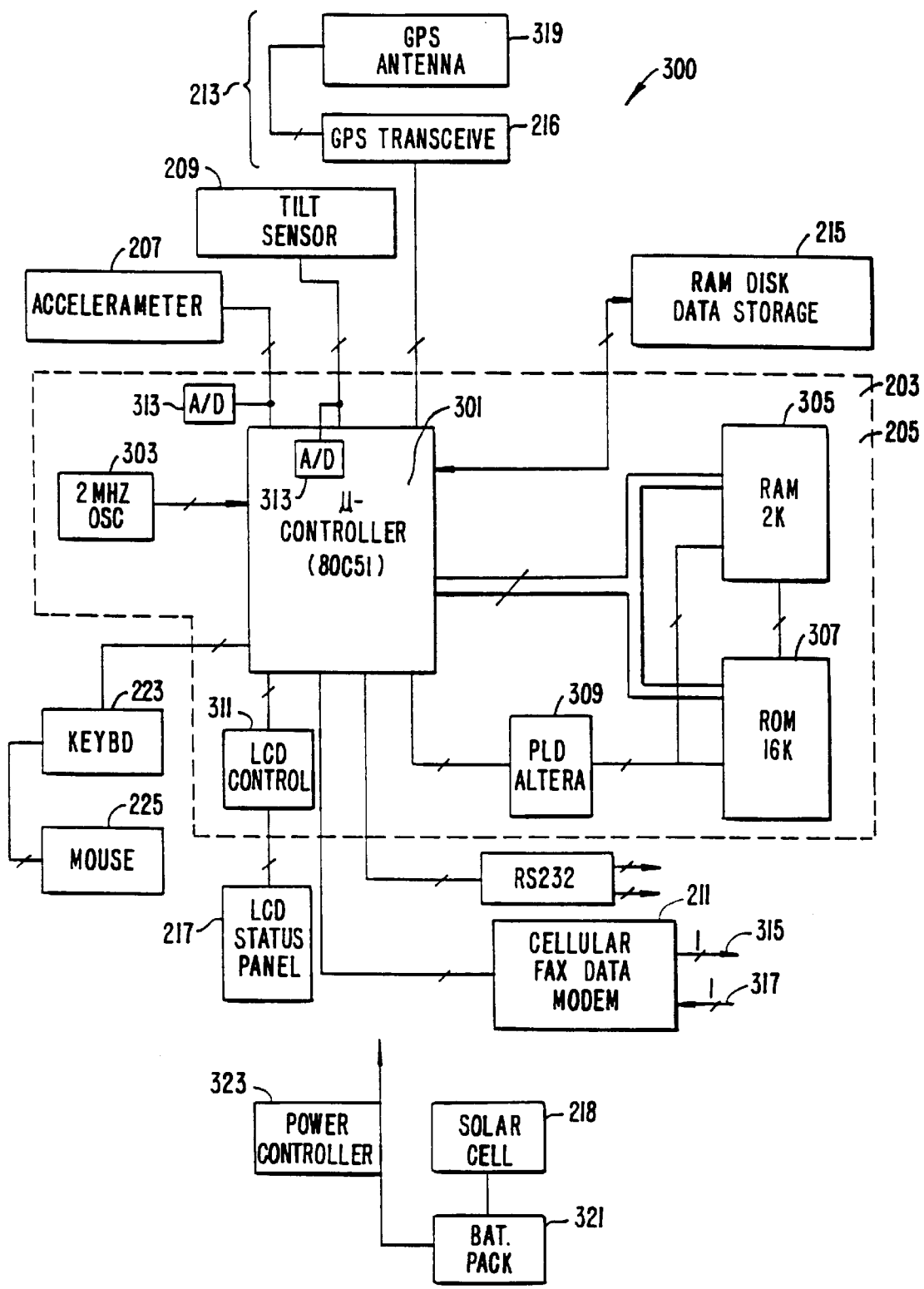
FIG. 3 is a more detailed block diagram of hardware for the device of FIG. 2 according to the present invention.

FIG. 3 is a more detailed block diagram 300 of hardware for the tracking device according to the present invention. This block diagram is merely an illustration and should not limit the scope of the claims herein. One of ordinary skill in the art would recognize other variations, modifications, and alternatives.

The block diagram 300 includes a preferred embodiment including numerous common elements to the ones described in FIG. 2, for example. Many of these elements are referenced using the same numerals for easy reading and cross-referencing. As shown, the block diagram includes devices, which would be found on the central processing board 203 and interface board 205. For instance, the central processing board 203 would include a microprocessor 301.

Microprocessor 301 is connected to a clock or oscillator 303 for providing clock signals to the microprocessor 301. A variety of computer readable memory including a random access memory 305, a read only memory 307, and a programmable logic chip 309, and the like are connected or coupled to the microprocessor 301. An LCD controller chip 311 interfaces between the microprocessor and display 217, which is an LCD panel in this embodiment. The RS-232 port is coupled to the microprocessor. The keyboard 223 and mouse 225 are also coupled to the microprocessor. Additionally, the accelerometer 207 and the tilt sensor 209 are coupled to the microprocessor 301 through A/D converters 313, which change the analog signals from these devices into digital.

Modem 211 is a cellular facsimile and data modem, which is connected to the microprocessor 301. Modem 211 transmits 315 and receives 317 signals from a user at a tracking station or central processing office, for example. These signals include data related to time, location (e.g., latitude and longitude), speed, direction, acceleration, tilt, and others. Additionally, control signals may be transmitted and received from the modem 211.

The GPS sensor, including a transceiver 216 and antenna 319, are coupled to the microprocessor 301. Power is provided to the above devices using the photovoltaic array or solar cell 218. Backup battery power is provided using a battery power source 321. To ensure that the power is maintained reliably, a power controller 323 interfaces between the power sources and the devices, e.g., microprocessor, memory. Data storage is provided using a memory 215 in the form of a random access memory disk data storage unit.

III. Processing Overview

Figure 4:
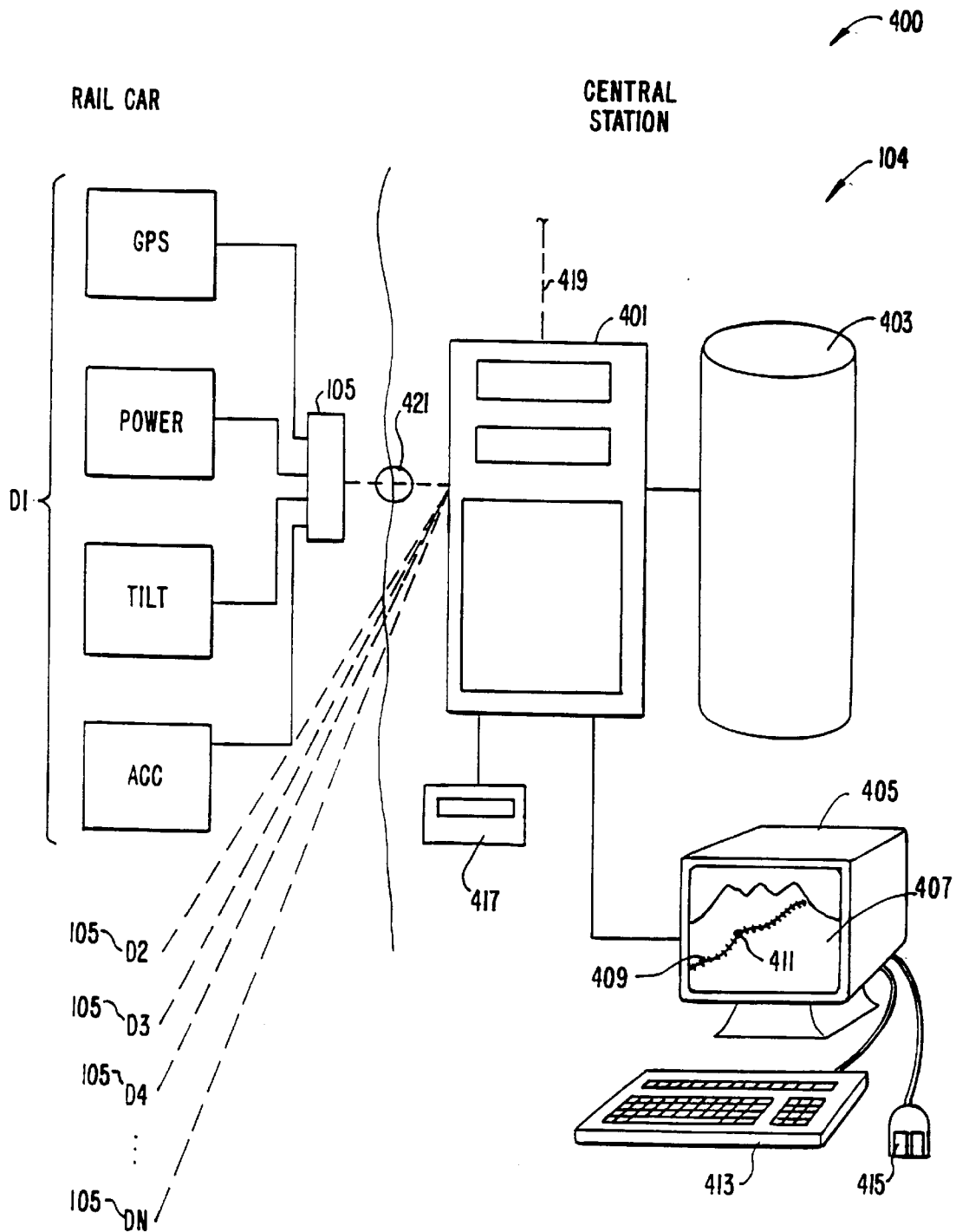
FIG. 4 is a block diagram of the rail car monitoring system according to the present invention.

FIG. 4 is a block diagram of a rail car monitoring system 400 according to an alternative aspect of the present invention. The rail car monitoring system 400 includes 400 a plurality of tracking devices (D1, D2, D3, D4 . . . DN) 105, the tracking station or central processing facility 104, among other features. This diagram and merely an illustration and should not limit the scope of the claims.

Each of the tracking devices 105 is fitted onto a rail car such as the one described. The rail car traverses successively along a railway route depending upon the train schedule. The tracking device monitors rail car information as the rail car traverses along the track. Each of the rail cars provide rail car information about a selected section of track and time to the tracking station, which records and analyzes the rail car information over time.

The tracking station 104 receives the rail car information from the tracking device in each rail car 105 through a variety of techniques. In particular, the tracking device transmits the rail car information via modem directly to the tracking station in a continuous or in-situ manner. Alternatively, the tracking device transmits the rail car information directly to the tracking station in a periodic manner, e.g., time, location, amount of data. Alternatively, the tracking device stores the rail car information within memory, which will be stored there until the information is transferred at the tracking station 104. Alternatively, the tracking device transmits the rail car information through a depository 421, which is in communication with the central office 401. The depository 421 can be defined along the railway system and transmits the rail car information via a communication network such as a satellite network, a wireless network, a wide area network, a cellular network, the Internet, and the like to the tracking station 104.

Tracking station 104 includes a large processing device 401, which processes a large quantity of rail car information from the numerous rail cars in tracking devices in the railway system. The large processing device is often a main frame computer such as a UNIX machine, a high end workstation, or a personal computer, in some cases. The processing device 401 stores the rail car information in a computer readable storage device 403. The storage device 403 can be in the form a disk storage (e.g., RAID), a floppy storage, a tape storage, optical storage media such as CD ROM, DRAM, SRAM or the like. The storage device 403 preferably has sufficient memory capability and is easily upgradable for higher levels of memory. Rail car information can be output from the storage device 403 through the processing device 401 to a printer 417 or other output devices. A user interface in the form of a display 405 is coupled to the processing device 401. The user interface also includes a keyboard 413 and a mouse 415.

Figure 5:
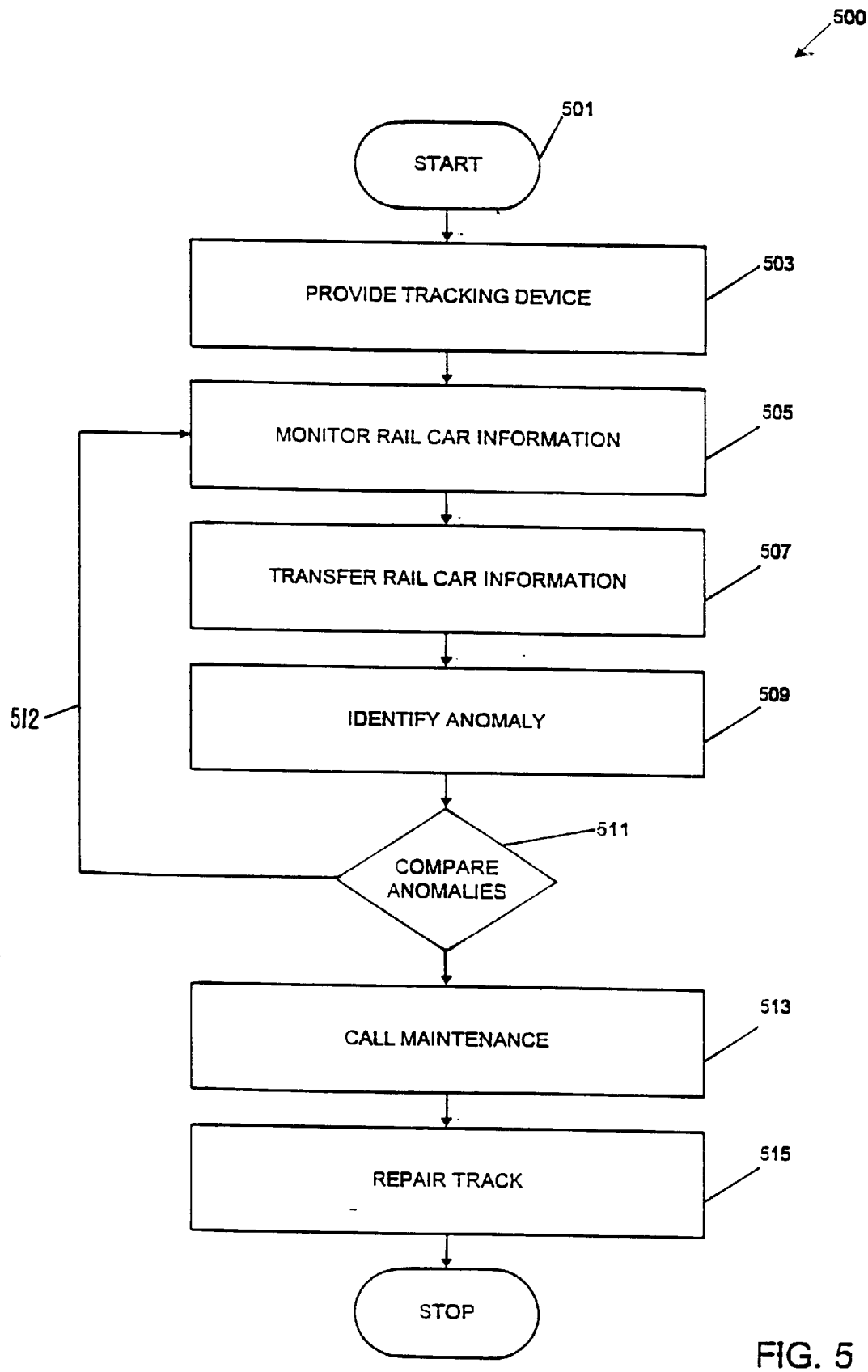
FIG. 5 is a simplified flow diagram of a rail car monitoring method according to the present invention.

The processing device 401 accesses specialized software, typically stored in storage device 403, that analyzes the rail car information to identify a potential defect in the railway system, e.g., track. The defect can be defined as an anomaly in the track or track assembly that requires at least a detailed inspection of the track and may require repair of the track to prevent a possibility of track failure. In an embodiment, the processing device 401 displays the defect in the form of an icon 409 on a computer generated map 407, which displays the icon based upon latitude and longitude data from the GPS sensor. The processing device 401 can also be coupled to a common wide area network 419 using a TCP/IP transmission scheme. Further overview techniques using the rail car monitoring system are described below and illustrated by way of FIGS. 5–6.

A method according to an embodiment of the present invention may be briefly outlined as follow.

(1) Provide a tracking device onto a rail car;

(2) Monitor rail car information (e.g., location, changes in acceleration, changes in angle) over a selected railway route using the tracking device;

(3) Transfer rail car information from the tracking device to a tracking station;

(4) Identify a possible anomaly in a selected region of the railway system using the rail car information to create a data point for the anomaly;

(5) Repeat steps (2) and (4) for different rail cars and times for a plurality of data points;

(6) Compare the plurality of data points to predict a future behavior of the selected region of the railway system;

(7) Call maintenance crew to repair selected track section; and (8) Repair selected track section.

The above sequence of steps uses rail car information which is retrieved over time to predict the future behavior of a selected region of a railway. This sequence of steps is merely an illustration and should not limit the scope of the claims herein. One of ordinary skill in the art would recognize other modifications, variations, and alternatives. Details of the sequence can be illustrated by way of the description below and FIG. 5, for example.

The method 500 begins at step 501. In particular, the method uses a tracking device, which is placed (step 503) onto a rail car. As previously discussed, the tracking device includes an accelerometer, a tilt sensor, and other elements. The tracking device monitors (step 505) movement of the rail car unit as it travels down a railway. This rail car information (e.g., location, changes in acceleration, changes in angle, time, speed, direction) is tracked over a selected railway route using the tracking device. The rail car information is transferred from the tracking device to the tracking station, where data is collected an analyzed. The tracking station identifies a possible anomaly (step 507) in a selected region of the railway system using the rail car information. Overtime, the tracking station receives additional data of the anomaly from rail cars over the selected region to create a plurality of data points, such as ones illustrated by FIG. 6, for example. These data points are compared (step 511). If the last data point received is outside of a control limit, a request (step 513) is sent to a maintenance group, which will go to the track location having the anomaly to inspect and/or repair (step 515) it. Alternatively, the method continues to procure additional rail car information about the anomaly via branch 512. Details of analyzing the data points can be illustrated by way of FIG. 6 below.

Figure 6:
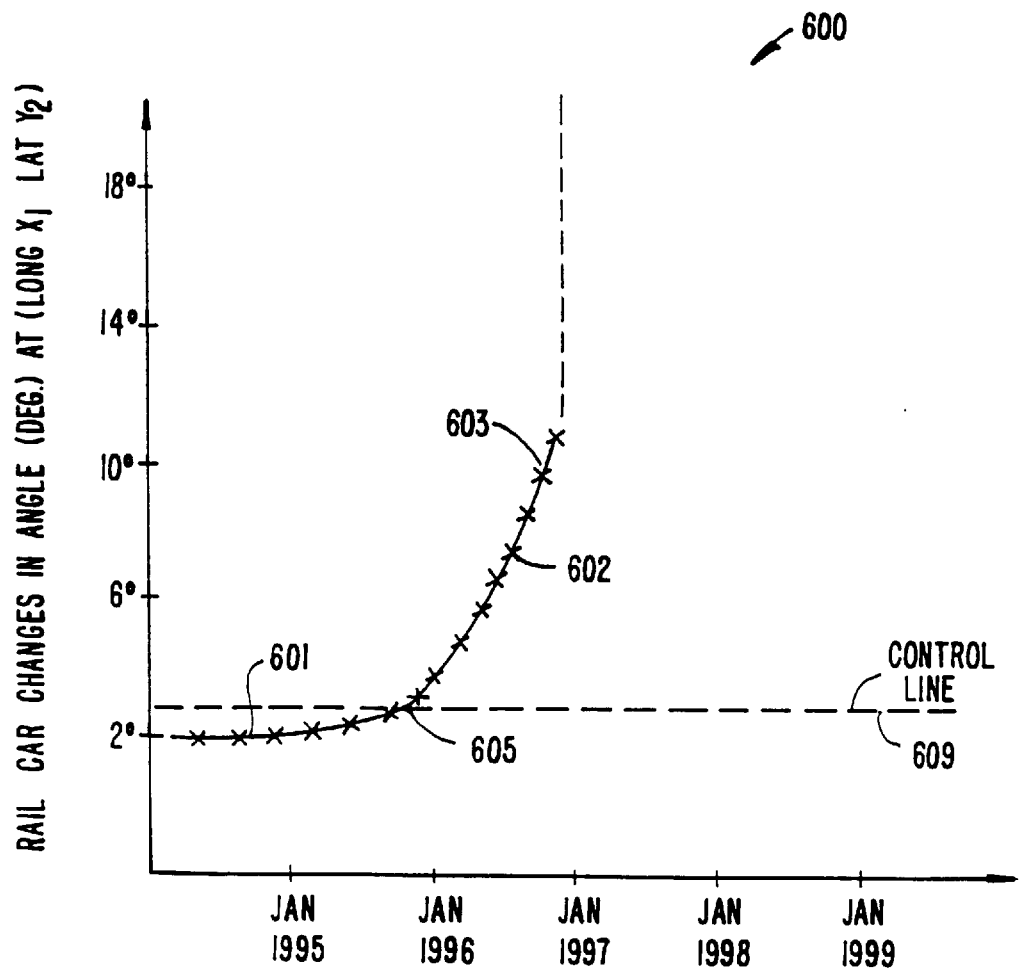
FIG. 6 is a simplified chart of a rail car monitoring method according to the present invention.

FIG. 6 illustrates 600 rail car angle on a vertical axis plotted against time on a horizontal axis. The tracking station has a processor and memory storage for providing data to form the relationship shown by FIG. 6. Each data point 602 represents an angle value of the rail car recorded by the tilt meter. A GPS sensor provides the geographical location of the rail car at the location where each data point is recorded. Numerous trains pass over the selected region having the anomaly to create the points along line 601, which. is generally constant in value. As the anomaly becomes more severe, the rail car moves in a larger angle as it travels over the anomaly, as illustrated by the line portion beginning at 605. This angle becomes progressively larger 603, until the track ultimately fails, which is illustrated by line 607. The tracking station monitors the changes in rail car angle overtime and sends a maintenance crew out to the track section when the angle exceeds a certain threshold or control line, such as the line 609. The maintenance crew receives a work request or maintenance sheet from the tracking station. The maintenance crew goes out to the section of track based upon the information provided by the GPS unit. An inspection and/or repair of the track section takes place. This allows for maintenance crews to repair track sections using the information provided by the rail car information accumulated over time before track failure.

While the above description is in terms of tracking changes in angle in a moving rail car unit, it would be possible to track other variables. For instance, the tracking system can also detect for lateral acceleration, a combination of tilt angle and lateral acceleration, lateral acceleration in relation to ambient temperature or rail car speed, and the like. Additionally, the relationship between the angle and time is in terms of absolute values. But it would be recognized that the relationship could be in terms of a relative value, a calibrated or normalized value or the like. Furthermore, conventional statistical process control techniques may be used to analyze the rail car information in various formats. Moreover, the tracking device is described in terms of a combination of hardware and software elements. These hardware and software elements are not intended to limit the scope of the claims. One of ordinary skill in the art would recognize that the functionality of the hardware and software elements can be further combined, or even separated, in additional hardware or software features.

IV. Processing Modules

Figure 7:
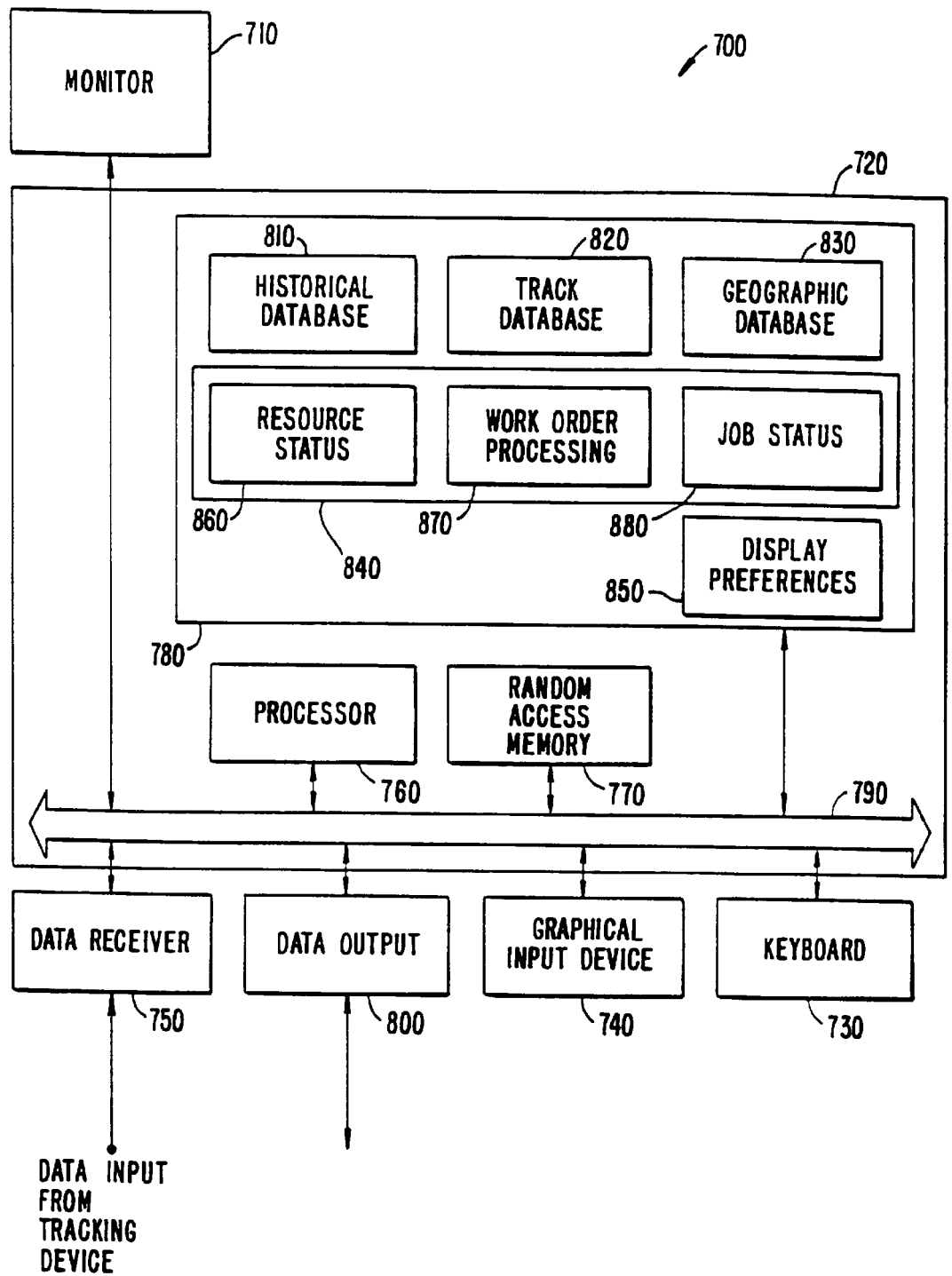
FIG. 7 illustrates a more detailed a block diagram of a system according to an embodiment of the present invention.

FIG. 7 illustrates a more detailed a block diagram of a system 700 according to an embodiment of the present invention. System 700 includes a monitor 710, a computer 720, a keyboard 730, a positioning device 740, and a data receiver 750. Computer 720 includes familiar computer components such as a processor 760, and memory storage devices, such as a random access memory (RAM) 770, a disk drive 780, and a system bus 790 interconnecting the above components. A data output device 800 can be coupled to system bus 790 to provide system 700 with network access, printer access, etc.

A mouse, a trackball, and a drawing tablet are examples of positioning device 740. RAM 770 and disk drive 780 are examples of tangible media for storage of computer programs and data. Other types of tangible media include floppy disks, removable hard disks, network servers, optical storage media such as writable CD-ROMS and bar codes, semiconductor memories such as flash memories, read-only-memories (ROMS), ASICs, and battery-backed volatile memories, and the like. The system bus may be a PCI bus, VME bus, or the like.

In a preferred embodiment, System 700 includes a 80586 class microprocessor based computer running WindowsNT™ operating system from Microsoft, Incorporated and proprietary hardware and software available from Cairo Systems, Incorporated.

FIG. 7 is representative of but one type of system for embodying the present invention. It will be readily apparent to one of ordinary skill in the art that many system types and configurations are suitable for use in conjunction with the present invention.

In the preferred embodiment of the present invention, as illustrated in FIG. 7, disk drive 780 typically includes a historical database 810, a track database 820, a geographic database 830, an order processing module 840, and a display preference/overlay module 850. Disk drive 780 may be one physical drive, may be separate physical drives, may be a network server, or other combinations of external and internal tangible media.

Historical database 810 may be implemented by any conventional database or database program. Historical database 810 typically stores and returns data received from tracking device 105. In one embodiment, typical historical data stored in historical database 810 includes, positional data such as the longitude and latitude of the report, and status data, such as the tilt of tracking device 105, the lateral acceleration, the speed of the rail car, the reporting position, the time of the report, an identification number of the particular tracking device, ambient temperature, and the like. Historical databases 810 including a greater number of parameters or a fewer number parameters are contemplated in alternative embodiments of the present invention.

Positional data and status data are typically received by computer 720 from data receiver 750. As historical databases are built-up by use of embodiments of the present invention, in the future, it is contemplated that electronic databases including such data can be up-loaded onto other systems or down-loaded into other computers, and bought and sold. Sources of down-loaded data include removable disk drives, electronic mail, computer networks including the Internet, and the like.

Track database 820 may be implemented by any conventional database or database program. Track database 820 is included in the preferred embodiment of the present invention to provide physical data about the rail track network. In one embodiment, typical track data stored in track database 820 includes, the grade of the track, the frequency of usage, whether the track is elevated, the accessibility of the track, type of construction, age, maximum speed, and the like. Track databases 820 including more data or less data are contemplated in alternative embodiments of the present invention. Typically, tracks are identified by positional data, such as longitude and latitude, or by an input track segment number. In response, to the positional data, for example, information about a specific track is returned from track database 820. In alternative embodiments of the present invention, track database 820 may not be included if the user does not require such data.

Geographic database 830 may be implemented by any conventional geographic database or database program. Typically, geographic database 830 contains geographic information including topological data, routes of the rail track network, locations of numbered track segments, and the like. Geographic database 830 is typically accessed by entering positioning data of tracking device 105. Such positioning data may be provided by historical database 810, track database 820, order processing module 840, data receiver 750, and the like. Typically, in response to the positioning data, among other data, geographical database 830 generates an image of a geographic region that includes the longitude and latitude of the positional data. The scale of the geographic region displayed is fully user-selectable at different levels of zoom. Further, geographic database 830 also supports pan, scroll, rotate image, and other conventional display operations.

Order processing module 840 may include more that one type of integrated software applications. In one embodiment of the present invention, order processing module 840 includes, a resource status module 860, a work order module 870, a job status module 880, and the like.

Resource status module 860 typically reports the status of repair resources such as repair crews, e.g. available, in transit, not-available; the type of repair crew, e.g. survey crew, tie repair crew, gravel repair crew; the type equipment available, and the like.

Work order module 870 typically allows for matching-up of repair crews and defects, scheduling of repairs, generating of work orders for repair crews, etc. Work orders are also known in the industry as work requests, modification orders, modification requests, chits, etc.

Job status module 880 typically reports the status of repairs for identified defects, e.g. scheduled, repair work in-progress, repair completed, and the like.

Display preferences module 850 typically receives data from other modules and is used to generate overlay images for display. Exemplary type of data received by display preferences module 850 are as follows: from historical database 810 or data receiver 750, the tilt of tracking device 105, the lateral acceleration, the identification number of the particular tracking device, etc.; from track database 820, the grade of the track, the frequency of usage, the accessibility of the track, type of construction, age, the type of defect, etc.; from geographic database 830, the altitude of the track, the typical weather conditions (e.g. snow and ice) etc.; from order processing module 840, the defects under repair, available resources, the defects yet to be repaired, etc. The above list is non-inclusive or exhaustive, other data can be passed to display preferences module 850 in alternative embodiments of the present invention.

In response to such data, typically display preferences module 850 determines overlays to be superimposed upon the image of the geographic region displayed by geographical database 830. Examples of overlay parameters include overlay colors, shapes, icons, styles, graphics, video images, textual information and other conventional type of output to the user.

Figure 8:
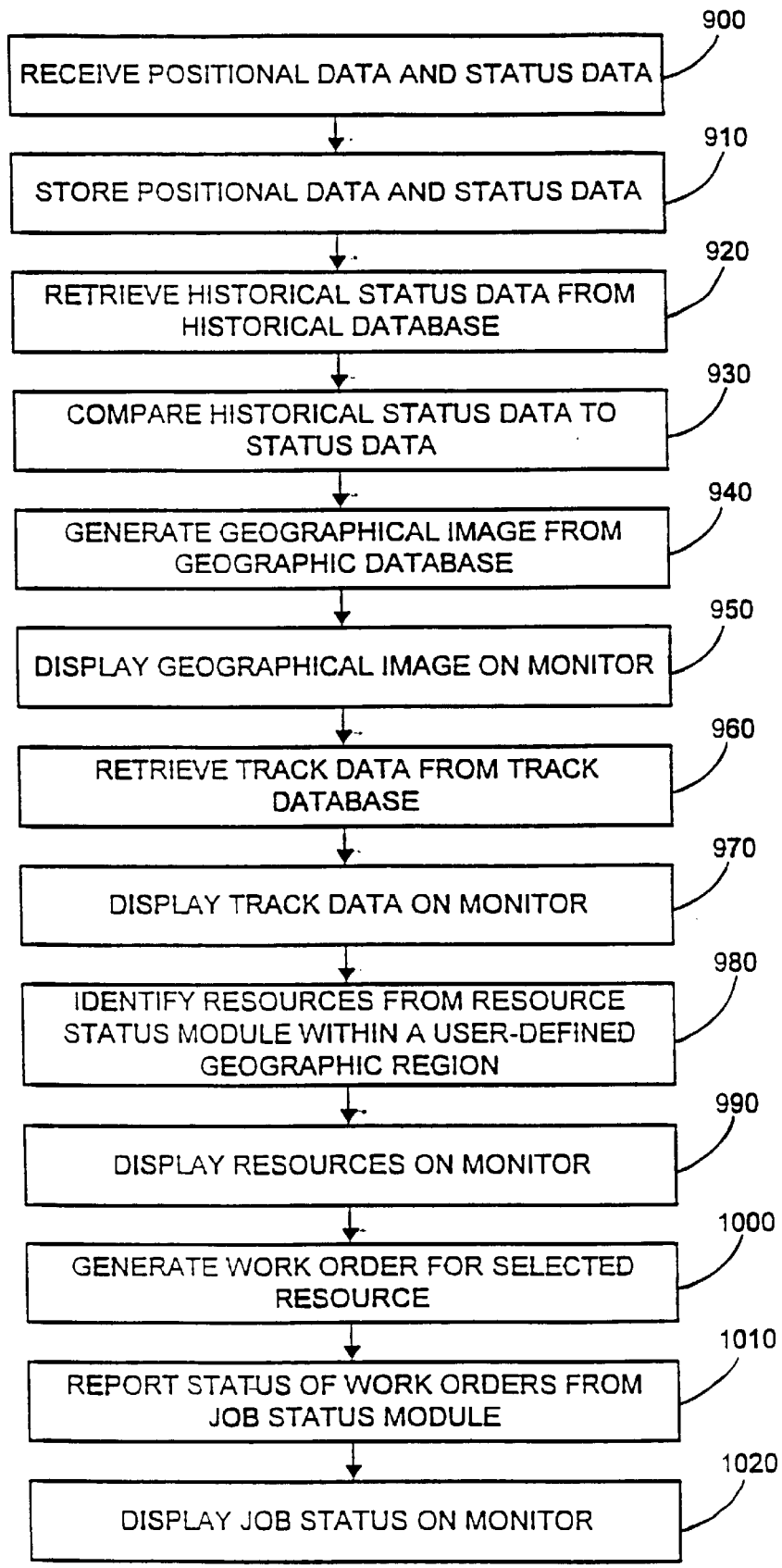
FIG. 8 illustrates a block diagram of a flow chart according to the present invention.

FIG. 8 illustrates a block diagram of a flow chart according to the present invention. FIG. 8 includes steps 900–1020, non-inclusive, with reference to the embodiment in FIG. 7 for convenience.

Initially data from tracking device 105 is received by data receiver 750, step 900. This may occur as described in conjunction with FIG. 5. Data received includes the positioning data such as the longitude and latitude of tracking device 105, and the status data, such as the tilt, the lateral acceleration and the like, as previously described.

In historical database 810, the data received is stored, step 910. Typically, historical database 810 is indexed by longitude and latitude. Next, historical database 810 retrieves historical status data corresponding to the positional data, step 920. The historical status data is then compared to the received status data, step 930. Such data comparison includes those described in conjunction with FIG. 5, including rate of change in the tilt angle, the acceleration of the change in the tilt angle, the rate of change in lateral acceleration, the acceleration of the change in the lateral acceleration, and the like.

In one embodiment of the present invention, when a defect is determined, the specific longitude and latitude are used by geographic database 830 to generate a geographical image of the geographical region, step 940. The geographic image is typically then displayed onto monitor 710, step 950. In the preferred embodiment, geographic database is implemented using an electronic database available from ETAK, Incorporated. Typically, using positioning device 740 to control a cursor on monitor 710, the user can easily adjust the scale of the geographical region. For example, 500 miles per inch on the display, 100 miles/inch, 10 miles/inch, etc. Further, the user can also pan and scroll around the geographic image using positioning device 740.

Figure 9:
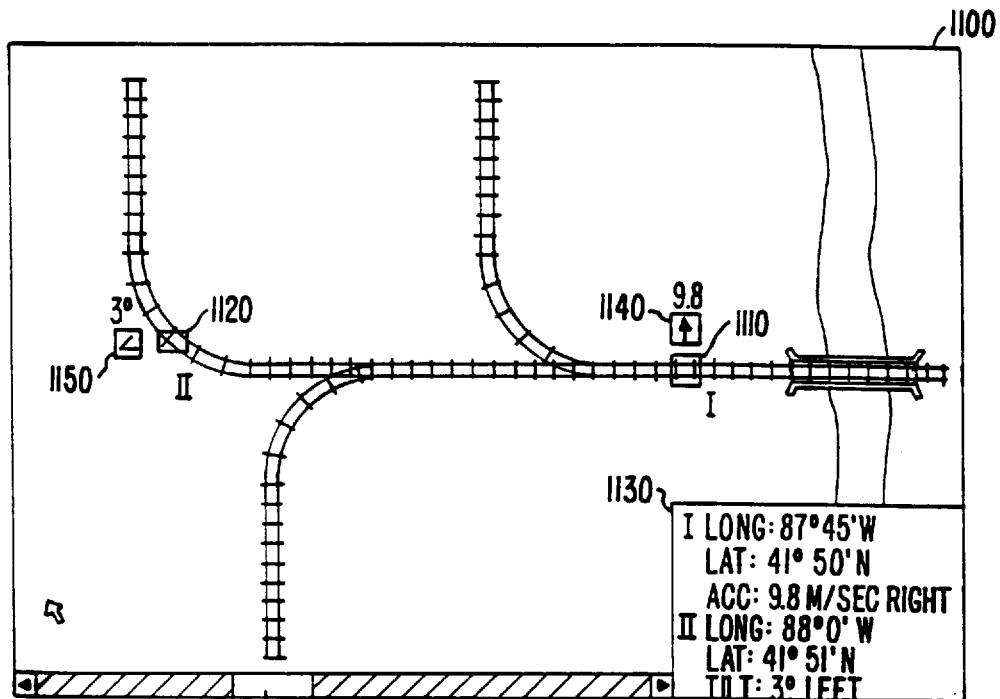
FIG. 9 illustrates a typical display of a geographic region on a monitor including defects.

FIG. 9 illustrates a typical display 1100 of a geographic region on monitor 710 including defects. FIG. 9 includes a region including geographic data including railway track, rivers, bridges, etc. As illustrated, FIG. 9 includes icon 1110 and icon 1120. Each icon is displayed on monitor 710 at geographic locations having defects, thus enabling the user to visually locate these defects. In this example, icon 1140 represents a lateral acceleration defect in the north part of the track, and icon 1150 represents a tilt defect having the illustrated magnitude.

In the embodiment illustrated, FIG. 9 also includes a text box 1130, that describes the longitude and latitude of each defect, as well as any other information the user wishes to receive. Combinations of text and icons are contemplated and used in alternative embodiments of the present invention.

In one embodiment of geographic database 830, geographic database 830 includes a description of rail track segments in relation to longitude and latitude. For example, geographic database 830 may describe a particular rail track segment as being a straight line from a first point at a first longitude and latitude and a second point at a second longitude and latitude. Thus in response to the specific longitude and latitude, geographic database 830 determines which rail track segments the defect corresponds to. This rail track segment can then used to address track database 820. This is known in the industry by the term geocoding or reverse geocoding, depending upon the direction of the transformation. In response, track database 820, typically returns track data corresponding to the rail track segment, including the data described above, including the grade, the typical weather conditions, etc., step 960. In an alternative embodiment, track database 820 returns track data simply in response to the specific longitude and latitude.

Track data corresponding to the rail may be identified by text on monitor 710, or alternatively by selected color on monitor 710, step 970. Typically, the track data is passed to display preference module 850 which then formats the data for display onto monitor 710. The display may be text superimposed on top of the geographical display or within a window in a reserved portion of the display. Alternatively, portions of the track on the geographical display may be color coded according to parameters such as grade.

Figure 10:
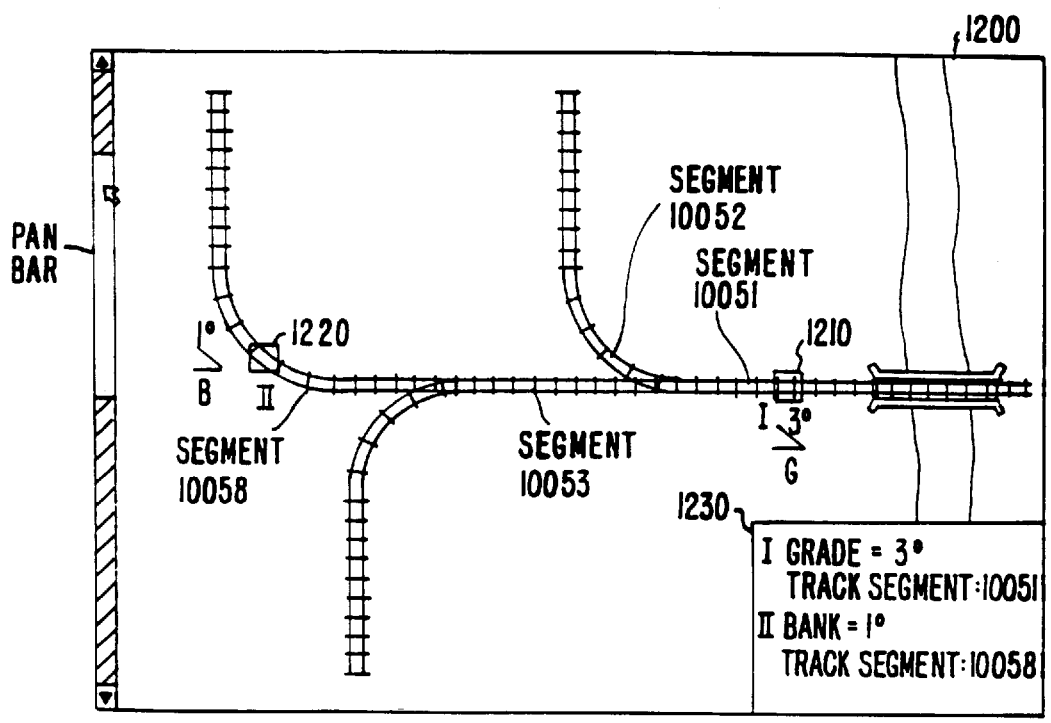
FIG. 10 illustrates a typical display of a geographic region on a monitor including railway data.

FIG. 10 illustrates a typical display 1200 of a geographic region on monitor 710 including railway data. As illustrated, FIG. 10 includes icon 1210 and icon 1220. Each icon is displayed on monitor 710 at user selected geographic locations. In this example, icon 1210 represents a railway having a 2 degree bank in the direction shown, and icon 1220 represents a railway having a 3 percent grade in the direction shown.

In the embodiment illustrated, FIG. 10 also includes a text box 1230, that describes the longitude and latitude of the user selected geographic location as well as any other information the user wishes to receive, such as average temperature. Combinations of text and icons are contemplated and used in alternative embodiments of the present invention.

In the present embodiment, order processing module 840 also receives the positional data and the type of defect identified. Specifically, in response, resource status module 860 typically identifies resources within a user-determined geographic area, step 980. Typically this user-determined geographic area is coincident with the size of the geographic region determined above. Alternatively, the user-determined geographic area can be a user-determined distance radius from the defect. The identified resources include repair crews, specialty, availability, and location, etc. In an alternative embodiment, the user can specify that only displays resources for a particular type of defect, only available crews, only the closest crew, etc. are returned. The type of resource data from resource status module 860 is thus fully user configurable. Further, by using graphical input device 740, the user can request that more information about particular resources by selecting the corresponding icon on monitor 710.

Resource data may be identified by text on monitor 710, or alternatively by a colored icon on monitor 710, or combinations thereof, step 990. Typically the resource data from resource status module 860 is passed to display preference module 850 which then formats the resource data for display onto monitor 710. The display may be text superimposed on top of the geographical display or within a window in a reserved portion of the display. Alternatively, icons of different shapes, sizes, and colors can be used to represent the resources on monitor 710.

Figure 11:
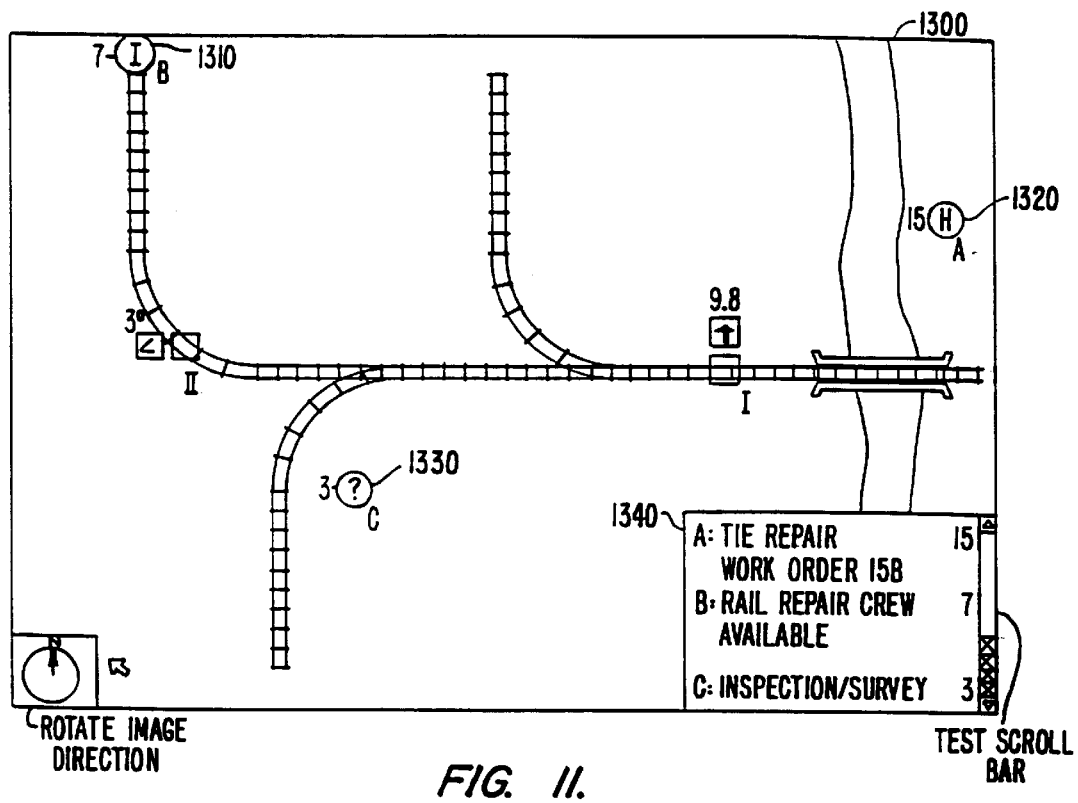
FIG. 11 illustrates a typical display of a geographic region on a monitor including resource data.

FIG. 11 illustrates a typical display 1300 of a geographic region on monitor 710 including resource data. As illustrated, FIG. 11 includes icon 1310, icon 1320, and icon 1330. Each icon is displayed on monitor 710 at geographic locations of repair resources, thus enabling the user to visually locate these resources. In this example, icon 1310 represents a rail repair car, icon 1320 represents a tie repair crew, and icon 1330 represents a survey/inspection team.

In the embodiment illustrated, FIG. 11 also includes a text box 1430, that describes the longitude and latitude of the resources as well as any other information the user wishes to receive, such as current status. Combinations of text and icons are contemplated and used in alternative embodiments of the present invention.

Next, typically work order module 870 is used to schedule the defect repairs, and to generate the work orders for the resources, step 1000. In one embodiment of the present invention, work order module 870 automatically determines the appropriate resources from the resource data provided by resource status module 860. In alternative embodiments of the present invention, the user uses graphical input device 740 to select the icon of a resource on monitor 710 and drags the icon onto the track that requires repair.

Figure 12:
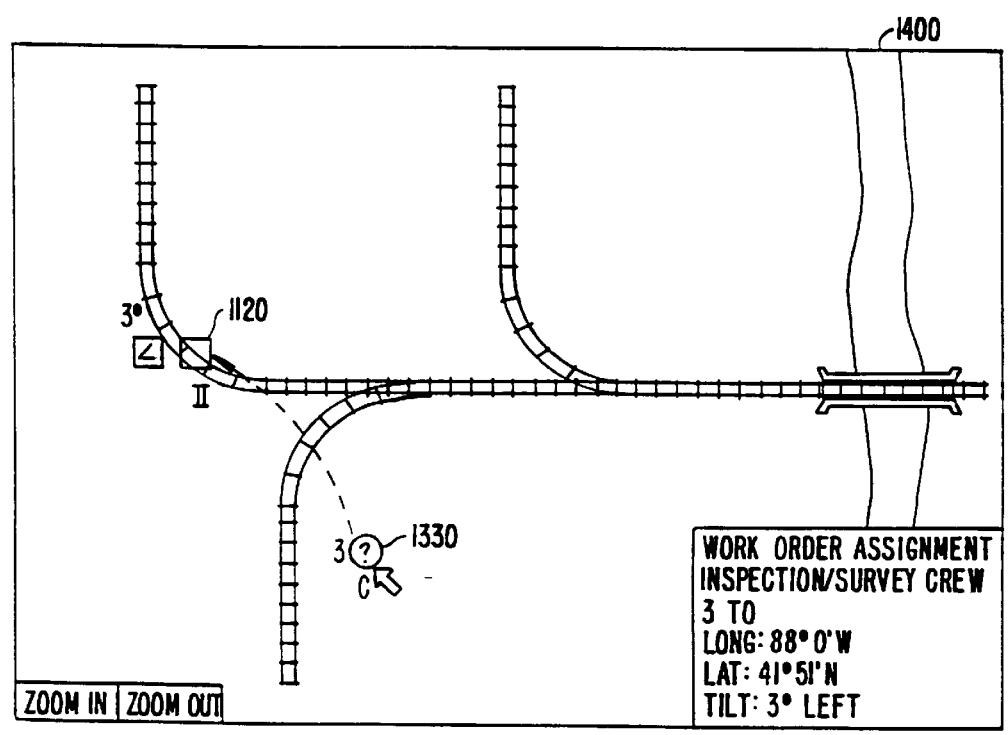
FIG. 12 illustrates a typical display of a geographic region on a monitor.

FIG. 12 illustrates a typical display 1400 of a geographic region on monitor 710. Using a cursor 1410 in this example, the user has selected the survey/inspection team (icon 1330, FIG. 11) and dragged icon 1330 onto the tilt defect (icon 1120, FIG. 9). In this way, the survey/inspection team is assigned to survey or inspect the tilt defect.

In the embodiment illustrated, FIG. 12 also includes a text box that describes the longitude and latitude of the defect, information about the survey/inspection team, and any other information the user wishes to receive. Combinations of text and icons are contemplated and used in alternative embodiments of the present invention.

In a preferred embodiment, when a particular geographic region is selected for viewing by the user, work order module 870 automatically reports the work order assignments of the resources within that particular geographic region. By using graphical input device 740, the user can request that more information about that work order, by selecting the corresponding icon on monitor 710.

Job status module 880 typically reports the status of the work orders, e.g. not yet begun, in-process, completed, late, etc., step 1010. Typically the job status data from job status module 880 is passed to display preference module 850 which then formats the job status data for display onto monitor 710, step 1020. The display may again be text superimposed on top of the geographical display or within a window in a reserved portion of the display. Alternatively, icons of different shapes, sizes, and colors can be used to represent the different status of work orders on monitor 710.

Figure 13:
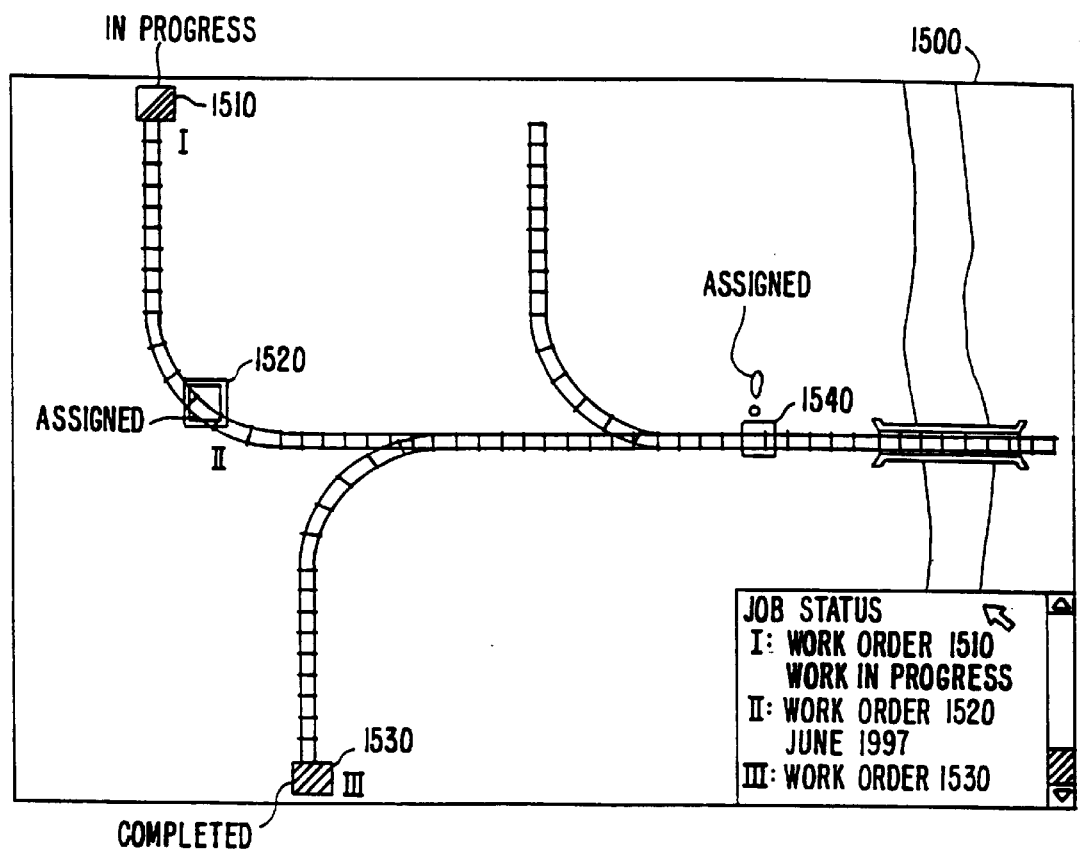
FIG. 13 illustrates a typical display of a geographic region on a monitor including job status data.

FIG. 13 illustrates a typical display 1500 of a geographic region on monitor 710 including job status data. As illustrated, FIG. 11 includes icon 1510, icon 1520, icon 1530, and icon 1540. Each icon is displayed on monitor 710 at geographic locations of work orders thus enabling the user to visually locate these repair jobs. In this example, icon 1510 represents that a work order is currently being fulfilled, icon 1520 indicates that a work order has been issued for this defect, icon 1530 indicates that a work order has been completed at that location, and icon 1540 indicates that a defect has not yet been assigned a work order.

In the embodiment illustrated, FIG. 13 also includes a text box 1550, that describes the work orders or any other information the user wishes to receive. Combinations of text and icons are contemplated and used in alternative embodiments of the present invention.

In a preferred embodiment, when a particular geographic region is selected for viewing by the user, job status module 880 automatically reports the status of work orders within that particular geographic region. By using graphical input device 740, the user can request that more information about that work order, by selecting the corresponding icon on monitor 710.

In one embodiment of the present invention, PCVtrak™ software available from Trimble Navigation, Incorporated can be used to implement one embodiment of historical database 810, geographic database 830, display preferences 850, and order processing modules 840.

CONCLUSION

In the foregoing specification, the invention has been described with reference to specific exemplary embodiments thereof. Many changes or modifications are readily envisioned. For example, it is envisioned that many additional software processing modules can be added to build upon the functionality of the presently claimed invention.

The presently claimed invention may also be applied to areas of transportation inspection besides the traditional railway. For example, the invention may be applied to magnetic levitation trains and other captive transportation systems. Further, the presently claimed invention can be interfaced with a transportation scheduling system, thus railcars, etc. can be routed around railways requiring repair. The transportation scheduling system can also route trains around sections of railways that are not defective but produce a lateral acceleration that exceeds the limits of the cargo or passengers.

The specification and drawings are, accordingly, to be regarded in an illustrative rather than a restrictive sense. It will, however, be evident that various modifications and changes may be made thereunto without departing from the broader spirit and scope of the invention as set forth in the claims. It is therefore not intended that this invention be limited, except as indicated by the appended claims.

What is claimed is:

1. A method for monitoring defects in a railway with a computer system, the computer system, the method comprising the steps of:

determining positional data and status data for a railway;

comparing historical status data to the status data to determine a defect for the railway, the defect having a defect type;

displaying an image of a particular geographic area on a display that includes a location corresponding to the positional data;

determining an icon associated with the defect type; and displaying the icon associated with the defect type on the display.

2. The method of claim 1 wherein the defect type is a lateral acceleration defect.

3. The method of claim 1 wherein a color for the icon associated with the defect type is proportional to a magnitude of the defect.

4. The method of claim 1 further comprising the step of:

determining railway data for the railway in response to the positional data;

determining an icon associated with the railway data; and displaying the icon associated with the railway data on the display.

5. The method of claim 1 further comprising the step of:

determining repair resources within the particular geographic area, the repair resources having a resource types;

determining icons associated with the resource types; and displaying at least one icon associated with at least one of the resource types on the display.

6. The method of claim 5 further comprising the step of:

assigning at least one of the repair resources to the defect; and generating a work order for at least one of the repair resources.

7. The method of claim 6 further comprising the step of:

determining an icon associated with the work order; and displaying the icon associated with the work order on the display.

8. The method of claim 6 further comprising the steps of:

determining a status for the work order, the status having a status type;

determining an icon associated with the status type;

displaying the icon associated with the status type on the display.

9. The method of claim 6 wherein the step of assigning comprises the steps of:

selecting the icon associated with at least one of the resource types on the display; and dropping the icon associated with at least one of the resource types onto the icon associated with the defect type on the display.

10. The method of claim 1 further comprising the step of:

selecting the icon associated with the defect type on the display; and displaying the positional data and the status data on the display.

11. The method of claim 1 further comprising the step of:

selecting the icon associated with the status type on the display; and displaying the status and the work order on the display.

12. A computer program product for a computer including a processor for monitoring railway defects, the computer program product comprising:

a computer-readable media including:

code that directs the processor to determine positional data and status data for a railway;

code that directs the processor to compare historical status data to the status data to determine a defect for the railway, the defect having a defect type;

code that directs a display to display an image of a particular geographic area that includes a locating associated with the positional data;

code that directs the processor to determine an icon associated with the defect type; and code that directs the display to display the icon associated with the defect type.

13. The computer program product of claim 12 wherein the computer-readable media also includes:

code that directs the processor to determine railway data for the railway in response to the positional data;

code that directs the processor to determine an icon associated with the railway data; and code that directs the display to display the icon associated with the railway data on the display.

14. The computer program product of claim 12 wherein the computer-readable media also includes:

code that directs the processor to determine a repair resource within the particular geographic area, the repair resource having a resource type;

code that directs the processor to determine an icon associated with the resource type; and code that directs the display to display the icon associated with the resource type on the display.

15. The computer program product of claim 14 wherein the computer-readable media also includes:

code that directs the processor to assign the repair resources to the defect;

code that directs the processor to generate a work order for the repair resource;

code that directs the processor to determine an icon associated with the work order; and code that directs the display to display the icon associated with the work order on the display.

16. The computer program product of claim 15 wherein the computer-readable media also includes:

code that directs the processor to determine a status for the work order, the status having a status type;

code that directs the processor to determine an icon associated with the status type; and code that directs the display to display the icon associated with the status type on the display.

17. The computer program product of claim 15 wherein the computer-readable media also includes:

code that directs the processor to select the icon associated with the status type on the display; and code that directs the display to display the status and the work order on the display.

18. A computer system for monitoring railway defects, the computer system comprising:

a processor;

a display coupled to the processor;

a computer-readable media coupled to the processor including:

code that directs the processor to determine positional data and status data for a railway;

code that directs the processor to compare historical status data to the status data to determine a defect for the railway, if any, the defect having a defect type;

code that directs a display to display an image of a particular geographic area that includes a region associated with the positional data;

code that directs the processor to determine an icon associated with the defect type, if any; and code that directs the display to display the icon associated with the defect type.

19. The computer system of claim 18 wherein the computer-readable media also includes:

code that directs the processor to determine railway data for the railway in response to the positional data;

code that directs the processor to determine an icon associated with the railway data; and code that directs the display to display the icon associated with the railway data on the display.

20. The computer program product of claim 18 wherein the computer-readable media also includes:

code that directs the processor to determine a repair resource within the particular geographic area, the repair resource having a resource type;

code that directs the processor to determine an icon associated with the resource type; and code that directs the display to display the icon associated with the resource type on the display.

* * * * *